Feb. 11, 1930.  E. R. POPE  1,746,276
ATTACHING MACHINE
Original Filed Dec. 4, 1922    2 Sheets-Sheet 1

INVENTOR

Feb. 11, 1930.  E. R. POPE  1,746,276
ATTACHING MACHINE
Original Filed Dec. 4, 1922  2 Sheets-Sheet 2
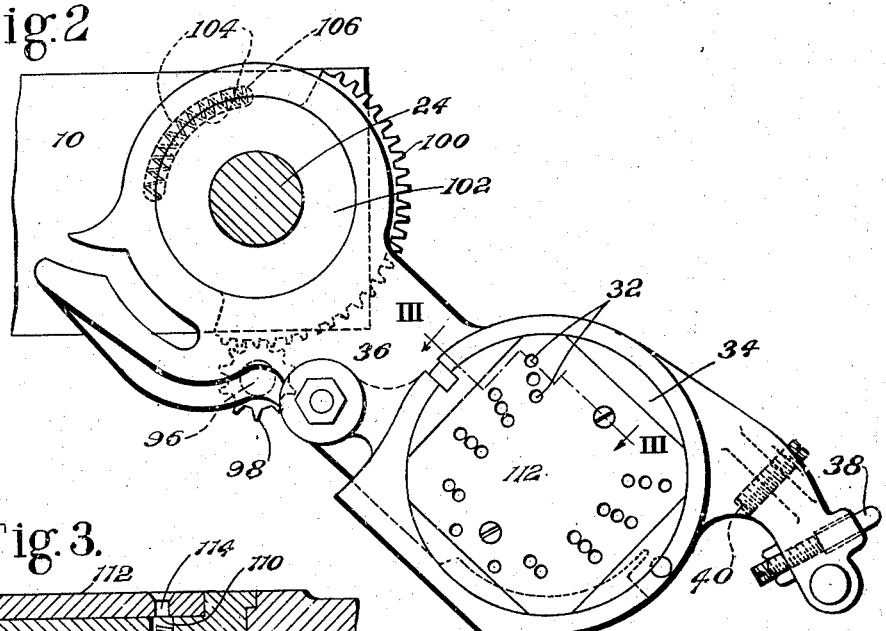
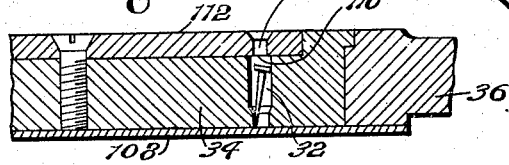
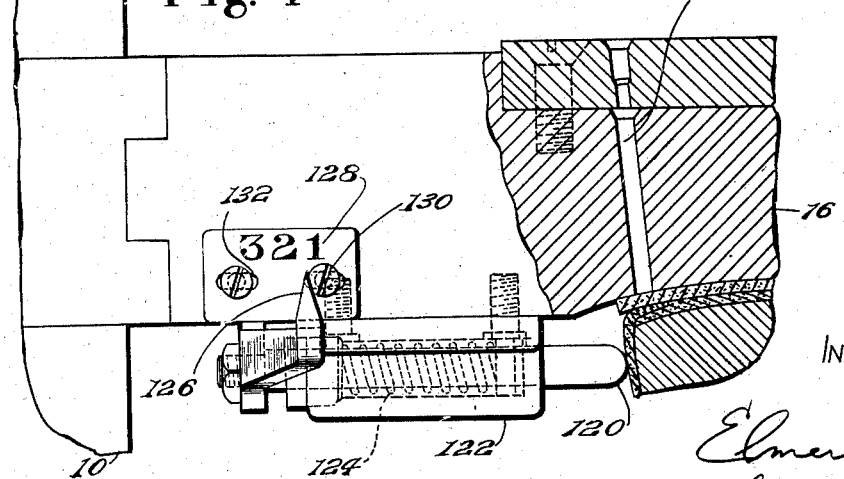
INVENTOR
Elmer R. Pope
By his Attorney
Nelson W. Howard Patented Feb. 11, 1930

1,746,276

UNITED STATES PATENT OFFICE

ELMER R. POPE, OF HAMILTON, MASSACHUSETTS, ASSIGNOR TO UNITED SHOE MACHINERY CORPORATION, OF PATERSON, NEW JERSEY, A CORPORATION OF NEW JERSEY

ATTACHING MACHINE

Original application filed December 4, 1922, Serial No. 604,751. Divided and this application filed July 20, 1927. Serial No. 207,234.

This invention relates to attaching machines as those for fastening together the cooperating elements of a shoe at the heel-seat, for securing a molded counter upon a turn shoe preparatory to the turning operation, or for attaching a shoe-heel. The present application is a division of an application for improvements in attaching machines, filed in my name on December 4, 1922, Serial No. 604,751, and which matured into Letters Patent of the United States No. 1,676,283 on July 10, 1928.

An object of the invention is to lessen the operations necessary to transfer the nails or other fasteners by means of loading mechanism from a receiving point to the die-block of the attaching machine. To this end, I actuate the loader-arm in a novel manner, as an incident to the movement of the jack which supports the work during the fastener-inserting operation. When the loader-arm is thus indirectly operated, either from the jack or otherwise, lack of exact agreement in the extent of travel between the element moved and the element producing the movement would interfere with their correct positioning, and, to avoid this, I include in the connection for the elements a spring which will permit a yield and therefore a continuation of advance of one element after the other has stopped.

The loader-arm or other fastener-transferring device is subjected to more or less shock by the stopping impact at the end of its delivering movement. This may be so great as to cause the fasteners to be jarred from the passages in which they are held temporarily by a shutter or gate, they flying out of the receiving ends of said passages. Such displacement of the fasteners it is another object of my invention to prevent. I accomplish this by using a fastener-receiving passage having an opening of less width than the body of the passage, an overhang thus being furnished, by contact with which displacement of the fasteners is arrested.

In nailing operations, especialy in the fastening of heel-seats, it is frequently troublesome for the operator to so adjust the angle of the shoe operated upon that the driven fasteners will be located correctly with relation to the rand-crease. It is still another object of the invention to enable the operator to determine readily and accurately when the work is in the desired relation to the die-block-openings. This I accomplish by the provision of indicating means provided with position-designations and actuated by contact with the shoe being operated on, this actuation preferably taking place through an interposed gage. Herein I have illustrated this gaging and indicating means as situated at the opposite sides of the work, identity of indication at the two sides showing the operator that the heel-seat is properly positioned.

In the accompanying drawings,

Fig. 2 shows the loader-arm in top plan;

Fig. 3 is a vertical section on the line III—III of Fig. 2; and

Fig. 4 is an enlarged detail in front elevation of the die-block with the associated gaging and indicating means, a portion being in section.

Figure 1:
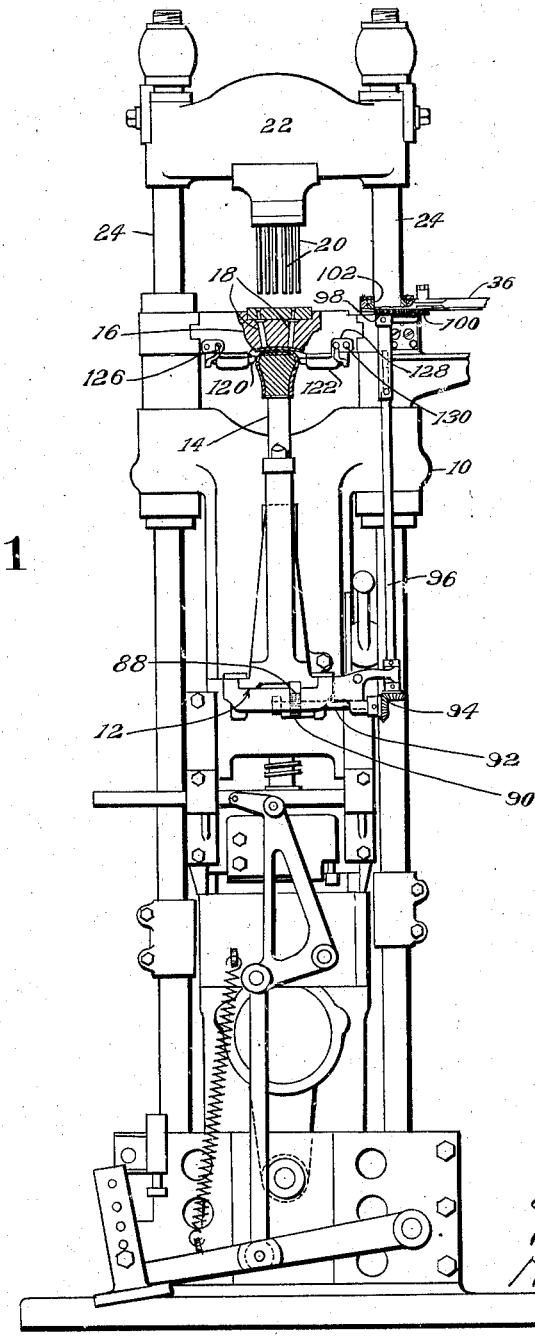
Fig. 1 shows a heel-seat-nailing machine organized in accordance with one embodiment of my invention.

Generally, the machine is organized as is a heeler of the well-known Lightning type, as set forth, for example, in United States Letters Patent No. 446,885, granted February 24, 1891, on application of Joseph H. Pope. For the purpose of the present description, this structure will be outlined but briefly. A frame 10 has, near its central portion, horizontal ways 12, in which may slide from front to rear of the machine, and the reverse, a work-supporting jack 14, which may occupy a position clear of a die-block 16 to permit the operator to apply the work to the jack, or beneath said die-block in the nail-driving position. This die block contains nail-holding passages 18, in which operate drivers 20 mounted upon a top girt 22 extending between the upper extremities of side rods 24, 24 arranged to reciprocate in the frame. The passages in the die-block are supplied with nails from openings 32 in a block 34 carried by a loader-arm 36. The arm is arranged to oscillate about one of the side rods 24 from a position in which a stop-projection 38, which it carries, locates the loader-block in its nail-receiving position, to the opposite extreme of movement, when a stop-projection 40 strikes a surface at the die-block. Here the block 34 is in its nail-delivering position.

To carry the loader-block from its nail-receiving position to its nail-delivering position above the die-block and to effect its return, it is connected to the jack 14 for oscillation as an incident to movement by the operator of the jack between the work-receiving and the operating positions. Carried horizontally upon the bottom of the jack is a rack 88 meshing with a pinion 90 secured upon the inner extremity of a horizontal shaft 92 journaled upon the frame 10. The shaft 92 is joined by bevel-gearing 94 to a vertical shaft 96 rotatable upon the frame, this latter shaft being connected by a pinion 98 with a segment 100 formed upon a short sleeve 102 surrounding the side rod 24 beneath the loader-arm. Arranged to turn within the arm, between it and the side rod, is an upwardly extending portion of the sleeve 102, and in this extension and in the arm are normally registering elongated depressions 104, 104. In these depressions is seated a helical spring 106, which is in contact with the opposite ends of the depressions and may be compressed by relative angular movement of the sleeve and loader-arm as it transmits movement between these elements.

Assuming the jack to be in its inner position beneath the die-block, the gearing connecting this to the loader-arm is so arranged that the loader-block will be at this time in its receiving position, clear of the die-block, being thus held by the contact of the stop-projection 38. There having been supplied to the openings 32 a load of nails, when the operator draws out the jack to remove the shoe the heel-seat of which has been nailed, the gearing oscillates the loader-arm to its delivery position, as fixed by the projection 40, over the die-block, the openings 18 of which receive the nails from the loader-block-openings 32 for the succeeding operation. If the limits of movement of the jack and loader-arm do not exactly correspond, the spring 106 permits a yield, being compressed in a counter-clockwise direction (Fig. 2) if there is excessive movement of the jack when the stop-projection 38 of the loader-arm determines the nail-receiving position, and in a clockwise direction when the projection 40 engages the die-block.

To prevent the jar of contact between the loader-arm-stops and the co-operating surfaces from throwing the nails from the passages 32, in which they are supported during their transfer by the usual shutter 108, each passage above the nail-holding chamber has an overhanging annular shoulder 110, with which the head of the nail, resting, as is illustrated in Fig. 8 of the drawings, against the side of the holding chamber, will contact and be retained against upward displacement from the passage. This overhang may be furnished by a plate 112 situated in a recess in the upper face of the loader-block, and having receiving openings 114 of less diameter than the nail-holding chambers and preferably concentric therewith. The openings 114 are of sufficient width to readily admit the nails, but, as already pointed out, prevent, by contact at 110, the jarring of the nails from the passages.

The rear portions of outsoles, when the heel-seat-nailing is done, are so large and irregular as to prevent the operator from accurately determining the relation of the rand-crease, as is indicated by the adjacent counter-portion of the upper, to the die-block openings 18. He is therefore hampered in deciding when the angle of the shoe is such as to symmetrically locate the nails with reference to the opposite sides of the heel-seat. The only aid in this direction of which I am aware is the very crude and unsatisfactory one furnished by vertical lines incised upon the front edge of the die-block at the opposite sides of the nail-passages. To enable the operator to fix very exactly the position of the work, I mount beneath the die-block, at each side of the passages 18, a gage member consisting of a plunger 120 movable horizontally in a casing 122 against a spring 124 encircling the stem of the plunger within the casing. The inner adjacent extremities of the two plungers are situated opposite the counter-portion of a jacked shoe when in the nailing position, and at points just below the rand-crease. Upon each plunger-stem, outside of its casing, is fixed an index-finger 126 movable by the plunger over a scale 128 carried upon the front of the die-block. Each scale bears such position-designations as the numerals 1, 2, 3, reading from the inner end outwardly. The scales are shown as adjustably secured upon the die-block by screws 130 passing through horizontal slots 132, and are so placed that when the jacked shoe is thrust between the plungers and is turned to properly present its heel-seat to the die-block passages for nailing, the index-fingers will be more or less exactly alined with the scale-number of the group in which falls the size of shoe being operated upon. That is, there is a predetermined relation between the numbers and the position of the shoe acting upon the fingers. The same condition is true for each of the three groups, and if the fingers do not both coincide with the correct number, the operator turns the shoe upon the jack in a horizontal plane until this agreement is obtained, and then proceeds with the nailing of the heel-seat.

Having described my invention, what I claim as new and desire to secure by Letters Patent of the United States is:

1. In an attaching machine, a frame having horizontal ways, a jack movable in the ways, a horizontal shaft journaled in the frame adjacent to the ways, a vertical shaft journaled in the frame, a loader-arm pivoted upon the frame, and gearing connecting the jack and horizontal shaft, the horizontal and vertical shafts and the vertical shaft and loader-arm.

2. In an attaching machine, a frame having horizontal ways, a die-block mounted upon the frame, side rods arranged to reciprocate in the frame, drivers carried by the side rods and co-operating with the die-block, a loader-arm mounted to turn about a side rod, a jack movable in the ways below the die-block, and gearing connecting the jack and loader-arm.

3. In an attaching machine, a frame having horizontal ways, a die-block mounted upon the frame, side rods arranged to reciprocate in the frame, drivers carried by the side rods and co-operating with the die-block, a loader-arm mounted to turn about a side rod, a jack movable in the ways below the die-block, a shaft journaled below the jack, a shaft journaled parallel to the side rods, and gearing connecting the jack, shafts and arm.

4. In an attaching machine, a movable jack, a loader, and connections between the jack and loader, said connections including a spring.

5. In an attaching machine, a loader-arm, gearing having a portion extending within the loader-arm, a spring connecting the loader-arm and gearing, and connections for rotating the gearing.

6. In an attaching machine, a loader-arm, gearing having a portion extending within the loader-arm, a spring connecting the loader-arm and gearing, a movable jack, and connections for imparting the movement of the jack to the gearing.

7. In an attaching machine, a loader-arm, a rotatable member for oscillating the loader-arm, said member and arm being provided with registering recesses, and a helical spring situated within the recesses.

8. In an attaching machine, a transferring device having a fastener-receiving passage, means for closing and opening the delivery-extremity of the passage to temporarily retain and free the received fastener, and means associated with the receiving end of the passage for preventing accidental displacement of the fastener therefrom.

9. In an attaching machine, a loader-block provided with a fastener-receiving passage having its receiving opening of less width than the body of the passage.

10. In an attaching machine, a loader-block provided with passages, and a plate carried upon the upper face of the block and overhanging the ends of the passages, there being openings in the plate alined with the the passages.

11. In an attaching machine, a work-support, a movable gage member situated adjacent to the support, and indicating means associated with the gage member and provided with position designations.

12. In an attaching machine, a work-support, a movable gage member situated adjacent to the support, and indicating means associated with the gage member, said indicating means bearing a predetermined relation to the position of the supported work.

13. In an attaching machine, a work-support, a movable gage member situated adjacent to the support, a finger movable by the gage member, and a scale over which the finger may move.

14. In an attaching machine, a work-support, and indicating means movable by the supported work, said indicating means including a scale.

15. In an attaching machine, a work-support, and indicating means movable by the supported work, said indicating means including a scale graduated to correspond to correct positions during the attaching operation for work of different sizes.

16. In an attaching machine, a work-support, a gage member situated at each side of the support and being movable by the supported work, and indicating means associated with each gage member, the indicating means bearing to each other a predetermined relation.

17. In an attaching machine, a work-support, and indicating means situated at opposite sides of the support and being simultaneously movable by the supported work, both indicating means including scales giving like readings for correct positions of work of different sizes.

18. In an attaching machine, a die-block, a jack co-operating therewith, a plunger mounted upon the die-block at each side of the jack, springs forcing the plungers into contact with a jacked shoe, and index means operable by each plunger.

19. In a heel-seat-nailing machine, nailing mechanism, a jack, and indicating means operable by a jacked shoe and including a scale provided with graduations corresponding to correct nailing positions for different shoe-sizes.

20. In an attaching machine, a movable jack, a loader, and a spring arranged to transmit movement between the jack and loader.

In testimony whereof I have signed my name to this specification.

ELMER R. POPE.